United States Patent [19]
Harpenau et al.

[11] Patent Number: 6,072,253
[45] Date of Patent: Jun. 6, 2000

[54] LIQUID-COOLED ELECTRICAL MACHINE

[75] Inventors: Kevin Roy Harpenau, Ann Arbor; Michael Timothy York, Chelsea; Richard Kenneth Harris, Walled Lake; Steven John Yockey, Ann Arbor, all of Mich.

[73] Assignee: Ford Motor Company, Dearborn, Mich.

[21] Appl. No.: 09/206,759

[22] Filed: Dec. 7, 1998

[51] Int. Cl.[7] .............................. H02K 9/00; H02K 9/16
[52] U.S. Cl. ................................. 310/58; 310/54
[58] Field of Search ........................ 310/54, 58, 68 D, 310/89

[56] References Cited

U.S. PATENT DOCUMENTS

| | | | |
|---|---|---|---|
| 2,862,120 | 11/1958 | Onsrud | 310/54 |
| 3,624,432 | 11/1971 | Merz | 310/53 |
| 3,681,628 | 8/1972 | Krastchew | 310/54 |
| 4,221,982 | 9/1980 | Raver et al. | 310/59 |
| 4,262,224 | 4/1981 | Kofink et al. | 310/54 |
| 4,739,204 | 4/1988 | Kitamura et al. | 310/68 D |
| 4,818,906 | 4/1989 | Kitamura et al. | 310/58 |
| 4,870,307 | 9/1989 | Kitamura et al. | 310/54 |
| 4,980,588 | 12/1990 | Ogawa | 310/68 D |
| 5,095,235 | 3/1992 | Kitamura | 310/68 D |
| 5,798,586 | 8/1998 | Adachi | 310/54 |

FOREIGN PATENT DOCUMENTS

| | | |
|---|---|---|
| 59-83557 | 5/1984 | Japan . |
| 62-178139 | 8/1987 | Japan . |

*Primary Examiner*—Nestor Ramirez
*Assistant Examiner*—Judson H. Jones
*Attorney, Agent, or Firm*—Mark S. Sparschu

[57] ABSTRACT

An liquid-cooling system for an electrical machine comprises a rotor mounted on a shaft for rotation therewith and defining an axis of rotation, and a stator disposed coaxially with and in opposition to the rotor. The stator has stator windings, the stator windings having an axially-extending portion. The electrical machine further comprises a housing enclosing the stator and the rotor, the housing having an axial end, the axial end having a wall with an inner surface and an outer surface. The electrical machine also includes a cooling tube having a first end and a second end and an embedded portion thereof embedded between the first inner surface and the first outer surface, the embedded portion of the cooling tube located in substantial axial alignment with the axially-extending portion of the stator windings. In another aspect of this design, the inner surface of the wall of the axial end of the housing is substantially flat and is separated from an axial end of the rotor by an air gap. In a third aspect of this design, the housing of the electrical machine comprises a front housing portion and a rear housing portion. The front housing portion defines a first circumferentially-extending channel which encloses a first axially-extending portion of the stator windings and the rear housing portion defines a second circumferentially-extending channel which encloses a second axially-extending portion of the stator windings. Designs as disclosed herein provide effective cooling of an electrical machine while supporting packaging-efficient electrical machine designs.

20 Claims, 4 Drawing Sheets

६,०७२,२५३

LIQUID-COOLED ELECTRICAL MACHINE

BACKGROUND OF THE INVENTION

1. Field of the Invention

The present invention relates generally to electrical machines, and more particularly to cooling of electrical machines.

2. Description of the Related Art

Ways are continually sought to increase the electrical output of automotive alternators. With increased electrical output comes additional heat generated in the various electrical components of the alternator. In addition, friction in the bearings which support the rotor shaft of the alternator also generates heat. Because heat generated in an alternator is frequently the factor which limits the electrical output of the alternator, effective cooling of the alternator is very important.

Circulating liquid within an alternator has been recognized as an one means for providing cooling. A liquid cooling design which provides effective cooling and which can support demands for ever-reducing package size of the alternator can be particularly advantageous.

SUMMARY OF THE INVENTION

The present invention provides an electrical machine comprising a rotor mounted on a shaft for rotation therewith and defining an axis of rotation, and a stator disposed coaxially with and in opposition to the rotor. The stator has stator windings, the stator windings having an axially-extending portion. The electrical machine further comprises a housing enclosing the stator and the rotor, the housing having an axial end, the axial end having a wall with an inner surface and an outer surface. The electrical machine also includes a cooling tube having a first end and a second end and an embedded portion thereof embedded between the first inner surface and the first outer surface, the embedded portion of the cooling tube located in substantial axial alignment with the axially-extending portion of the stator windings.

In another aspect of the present invention, the inner surface of the wall of the axial end of the housing is substantially flat and is separated from an axial end of the rotor by an air gap.

In a third aspect of the present invention, the housing of the electrical machine comprises a front housing portion and a rear housing portion. The front housing portion defines a first circumferentially-extending channel which encloses a first axially-extending portion of the stator windings. The rear housing portion defines a second circumferentially-extending channel which encloses a second axially-extending portion of the stator windings.

Designs according to the present invention are advantageous in that they can provide effective cooling of an electrical machine while also supporting packaging-efficient electrical machine designs.

DETAILED DESCRIPTION OF THE PREFERRED EMBODIMENT

Figure 3:
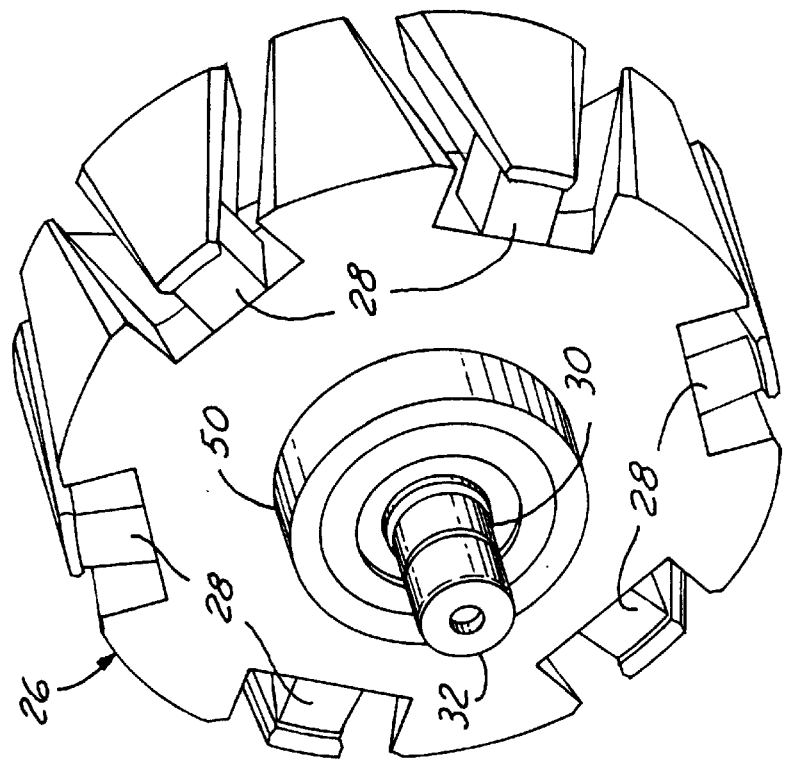
FIG. 3 is a perspective view of rotor 26 of alternator 20.
Figure 1:
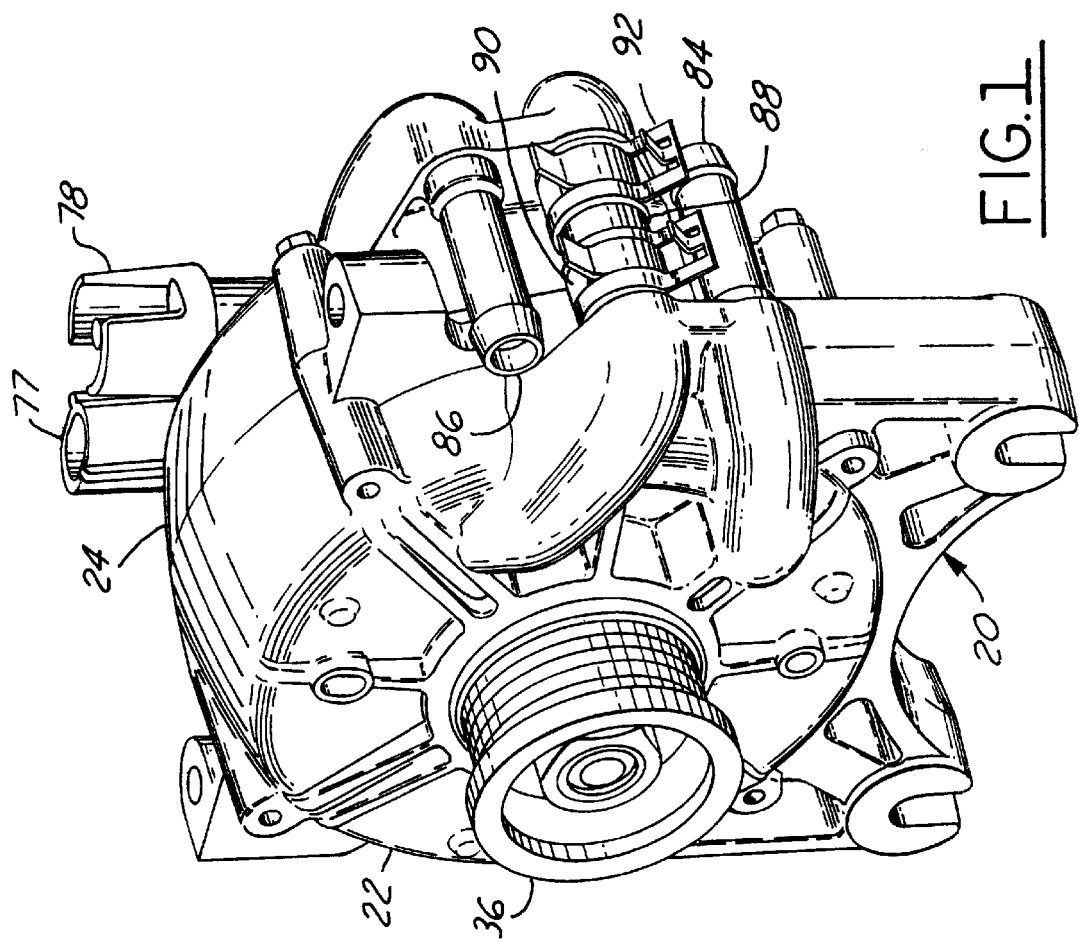
FIG. 1 is a perspective view of an alternator 20 according to one embodiment of the present invention.
Figure 2:
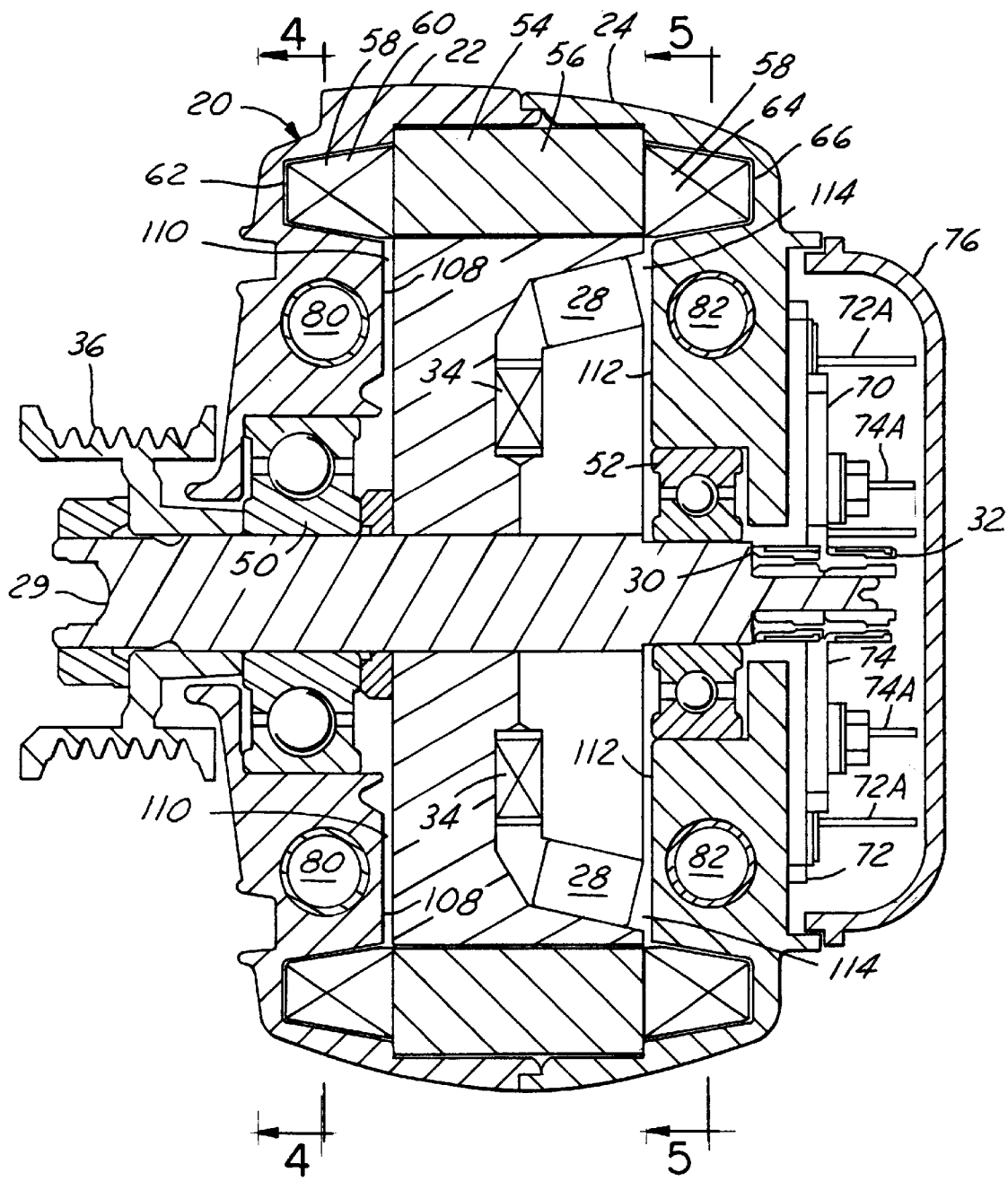
FIG. 2 is a cross-sectional view of alternator 20 taken along a plane parallel to the axis of rotation of alternator 20.

Refer first to FIGS. 1–3. An alternator 20 includes a front housing portion 22 and a rear housing portion 24 which are suitably bolted or otherwise attached together. Front housing portion 22 and rear housing portion 24 are preferably metallic. Included within front housing portion 22 and rear housing portion 24 is a rotor 26. Those skilled in the art will recognize rotor 26 as being generally of the "claw-pole" variety. A plurality of permanent magnets 28 are disposed within rotor 26 in order to enhance the electrical output of alternator 20.

Rotor 26 includes a shaft 29 having two slip rings 30 and 32 which are means for providing electrical power from a voltage regulator (not shown in the particular sectioning employed in FIG. 2) to a field coil 34 disposed within rotor 26. Also coupled to shaft 29 is a pulley 36, or other means for rotating rotor 26. Shaft 29 is rotatably supported by a front bearing 50, itself supported by front housing portion 22, and a rear bearing 52, rotatably supported by rear housing portion 24.

A stator 54 is disposed in opposition to rotor 26. Stator 54 includes a ferromagnetic stator core 56, on which stator windings 58 are wound. The end turns 60 of stator windings 58 on one axial side of stator core 56 are substantially enclosed in a groove 62 in front housing 22. The end turns 64 of stator winding 58 on the other axial side of stator core 56 are substantially enclosed in a groove 66 in rear housing 24. Preferably, end turns 60 and 64 are encapsulated in a highly thermally conductive compound in order to facilitate heat transfer away from stator windings 58.

A rectifier 70, coupled to stator windings 58 in order to rectify the alternating current output generated in stator windings 58 by the operation of alternator 20, is mounted to rear housing 24. Rectifier 70 includes a negative rectifier plate 72, which forms the common connection for the cathodes of the "negative" diodes 72A. Rectifier 70 also includes a positive rectifier plate 74, which forms the common connection for the anodes of the "positive" diodes 74A. Negative rectifier plate 72 and positive rectifier plate 74 are electrically insulated from one another. A plastic cover 76 covers the rear of alternator 20, including rectifier 70. Electrical connectors 77 and 78 provide the required electrical connections to and from alternator 20. As those connections are conventional, they are not described in detail here.

Front housing portion 22 also includes cooling tube 80, and rear housing portion 24 includes cooling tube 82. Cooling tubes 80 and 82 are preferably metallic, in order to assure good heat transfer from housing portions 22 and 24 to cooling tubes 80 and 82, respectively. Cooling tubes 80 and 82 are preferably die-cast into their respective housing portions 22 and 24. Of course, if cooling tubes 80 and 82 are included within housing portions 22 and 24 by die casting, the material comprising cooling tubes 80 and 82 must have a higher melting temperature than the material comprising housing portions 22 and 24, in order to allow cooling tubes 80 and 82 to be die-cast therein.

The ends of cooling tube 80 emerge from front housing portion 22, and the ends of cooling tube 82 emerge from rear housing 24. End 84 of cooling tube 80 forms an inlet into which cooling fluid can be introduced into alternator 20. End 86 of cooling tube 82 forms an outlet from which cooling fluid exits from alternator 20. The remaining two ends of cooling tube 80 and cooling tube 82 are coupled together by a "cross-over" formed by flexible tube 88 and two clamps 90 and 92. Cooling fluid can thus flow into inlet end 84 of cooling tube 80, through the length of cooling tube 80, through the "cross-over" into cooling tube 82, through the length of cooling tube 82, and out the outlet end 86 of cooling tube 82. Inlet end 84 and outlet end 86 are coupled to a source of cooling fluid such as the cooling system of a motor vehicle engine.

Figure 4:
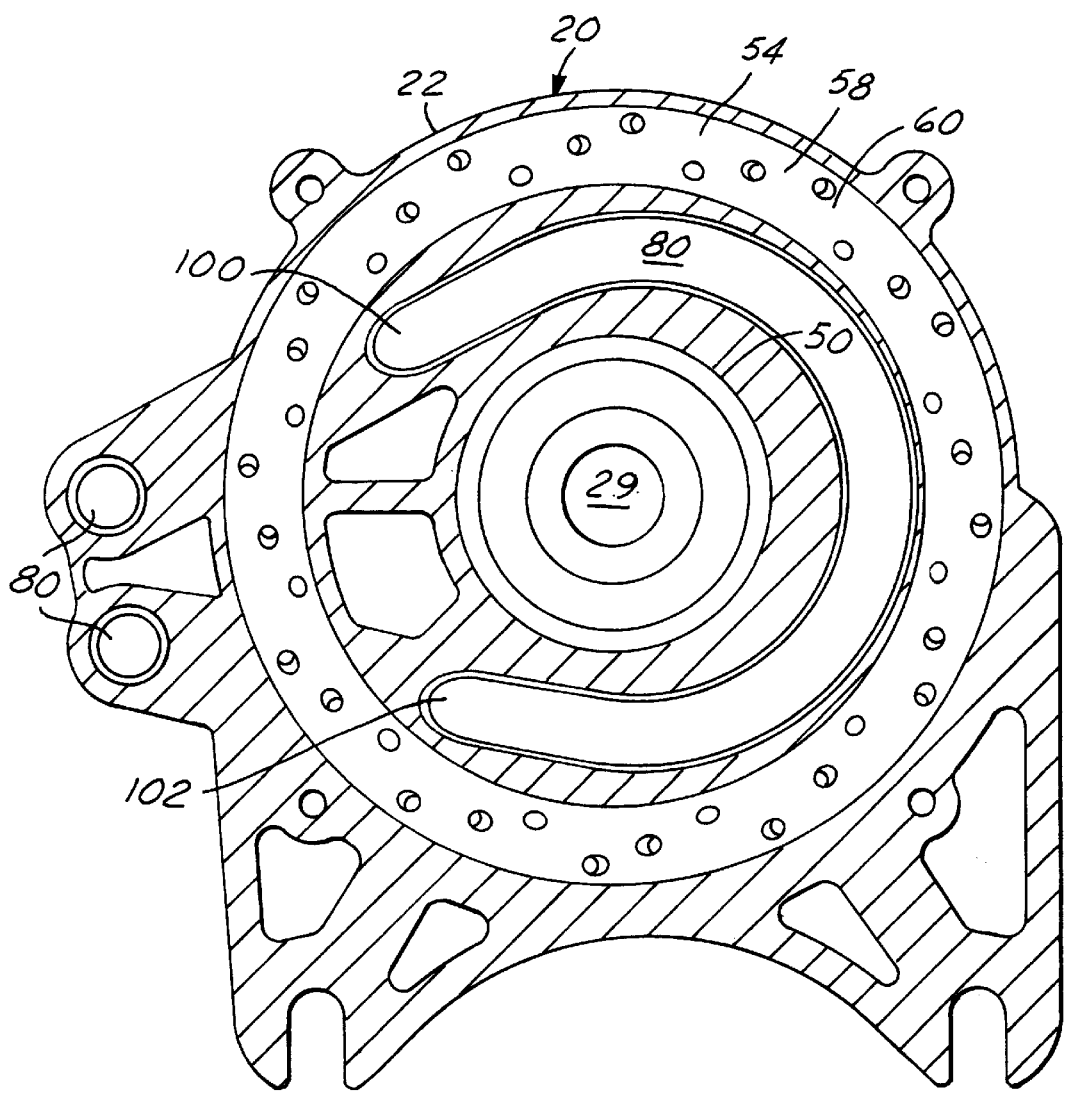
FIG. 4 is a cross-sectional view of alternator 20 taken along line 4—4 of FIG. 2.

Refer now of FIG. 4. There, it can be seen that cooling tube 80 is formed substantially as a circular loop until points 100 and 102, where cooling tube 80 begins to emerge from front housing portion 22.

Figure 5:
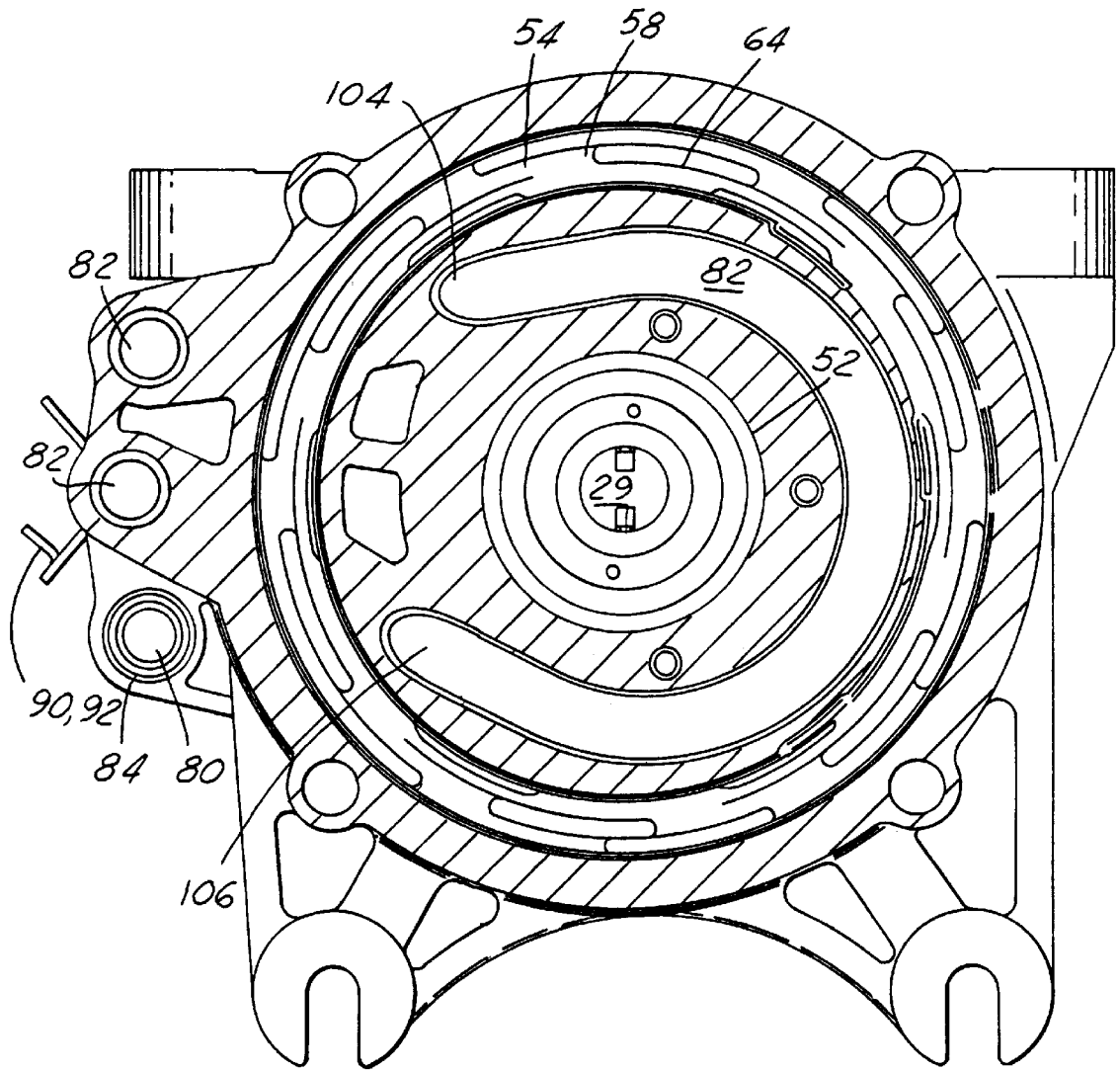
FIG. 5 is a cross-sectional view of alternator 20 taken along line 5—5 of FIG. 2.

Referring now additionally to FIG. 5, it can be seen that cooling tube 82 is also formed in a substantially circular loop until points 104 and 106, where cooling tube 82 begins to emerge from rear housing portion 22.

The design disclosed herein is particularly effective for cooling alternator 20, for a number of reasons. First, end turns 60 and 64 of stator 54 are substantially enclosed by grooves 62 and 66 in the housing of alternator 20. Because the housing is cooled by cooling tubes 80 and 82, heat generated in stator windings 58 is effectively conducted away from those windings. Second, front housing portion 22 presents a large, substantially flat surface 108 to rotor 26 across a small air gap 110. Air gap 110 is preferably about 0.5 millimeters wide. Because front housing portion 22 is cooled by cooling tube 80, the large, flat surface 108 across small air gap 110 provides for substantial heat transfer away from rotor 26, including heat generated in field coil 34. Rear housing portion 24 presents a similar large, substantially flat surface 112 to rotor 26 across a small air gap 114. Air gap 114 is preferably about 0.5 millimeters wide. Third, with bearings 50 and 52 mounted in housing portions 22 and 24 and in proximity with cooling tubes 80 and 82, heat generated in bearings 50 and 52 due to rotation of shaft 29 is effectively conducted away.

The design disclosed herein provides the cooling advantages described immediately above, while also contributing to alternator 20 having a short axial length. It can be seen that the axial alignment of cooling tube 80, end turns 60 and bearing 50, as well as the axial alignment of cooling tube 82, end turns 64 and bearing 52 cause alternator 20 to have the short axial length. This is very much an advantage in packaging alternator 20 in a vehicle.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electrical machine comprising:
   a rotor mounted on a shaft for rotation therewith and defining an axis of rotation;
   a stator disposed coaxially with and in opposition to said rotor, said stator having stator windings, said stator windings having an axially-extending portion;
   a housing enclosing said stator and said rotor;
   said housing having an axial end, said axial end having a wall with an inner surface and an outer surface; and
   a cooling tube having a first end and a second end and an embedded portion thereof embedded between said first inner surface and said first outer surface, said embedded portion of said cooling tube located in substantial axial alignment with said axially-extending portion of said stator windings.

2. An electrical machine as recited in claim 1, wherein said housing defines a circumferentially-extending channel which substantially encloses said axially-extending portion of said stator windings.

3. An electrical machine as recited in claim 1, wherein said inner surface of said wall is substantially flat and is separated from an axial end of said rotor by an air gap.

4. An electrical machine as recited in claim 3, wherein said air gap is of a substantially constant width.

5. An electrical machine as recited in claim 4, wherein said width is approximately 0.5 millimeters.

6. An electrical machine as recited in claim 1, further comprising a bearing rotatably supporting said shaft and in turn supported by said wall of said housing, said bearing in substantial axial alignment with said cooling tube.

7. An electrical machine as recited in claim 1, wherein:
   said stator windings have a second axially-extending portion;
   said housing has a second axial end, said second axial end having a wall with an inner surface and an outer surface; and
   said electrical machine comprises a second cooling tube having a first end and a second end and an embedded portion thereof embedded between said inner surface and said outer surface of said wall of said second axial end, said embedded portion of said second cooling tube located in substantial axial alignment with said second axially-extending portion of said stator windings.

8. An electrical machine as recited in claim 7, wherein said first end of said first cooling tube and said first end of said second cooling tube are coupled together to permit fluid flow between said first cooling tube and said second cooling tube.

9. An electrical machine as recited in claim 7, further comprising:
   a first bearing rotatably supporting said shaft and in turn supported by said wall of said first axial end of said housing;
   a second bearing rotatably supporting said shaft and in turn supported by said wall of said second axial end of said housing;
   wherein said embedded portion of said first cooling tube, said first axial-extending portion of said stator windings and said first bearing are in substantial axial alignment with one another; and
   wherein said embedded portion of said second cooling tube, said second axially-extending portion of said stator windings and said second bearing are in substantial axial alignment with one another.

10. An electrical machine as recited in claim 9, wherein:
   said embedded portion of said first cooling tube is located radially between said first axially-extending portion of said stator windings and said first bearing; and said embedded portion of second cooling tube located radially between said second axially-extending portion of said stator windings and said second bearing.

11. An electrical machine comprising:
   a rotor mounted on a shaft for rotation therewith and defining an axis of rotation;
   a stator disposed coaxially with and in opposition to said rotor, said stator having stator windings, said stator windings having an axially-extending portion;

a housing enclosing said stator and said rotor;

said housing having an axial end, said axial end having a wall with an inner surface and an outer surface; and a cooling tube having a first end and a second end and an embedded portion thereof embedded between said inner surface and said outer surface;

wherein said inner surface of said wall is substantially flat and is separated from an axial end of said rotor by an air gap.

12. An electrical machine as recited in claim 11, wherein said air gap is of a substantially constant width.

13. An electrical machine as recited in claim 12, wherein said width is approximately 0.5 millimeters.

14. An electrical machine as recited in claim 12, wherein:

said stator windings have a second axially-extending portion;

said housing has a second axial end, said second axial end having a wall with an inner surface and an outer surface;

said electrical machine comprises a second cooling tube having a first end and a second end and an embedded portion thereof embedded between said inner surface and said outer surface of said wall of said second axial end, said embedded portion of said second cooling tube located in substantial axial alignment with said second axially-extending portion of said stator windings; and said inner surface of said wall of said second axial end is substantially flat and is separated from a second axial end of said rotor by a second air gap.

15. An electrical machine as recited in claim 14, wherein said second air gap is of a second substantially constant width.

16. An electrical machine as recited in claim 15, wherein said second width is approximately 0.5 millimeters.

17. An electrical machine comprising:

a rotor mounted on a shaft for rotation therewith and defining an axis of rotation;

a stator disposed coaxially with and in opposition to said rotor, said stator having stator windings, said stator windings comprising a first axially-extending portion and a second axially-extending portion;

a housing enclosing said stator and said rotor;

said housing having a front housing portion defining a first axial end of said housing, said first axial end having a first wall with a generally flat first inner surface and a first outer surface;

said housing further having a rear housing portion defining a second axial end of said housing, said second axial end having a second wall with a generally flat second inner surface and a second outer surface, wherein said second inner surface and said second outer surface are integrally formed in said rear housing portion;

said front housing portion defining a first circumferentially-extending channel which encloses said first axially-extending portion of said stator windings;

said rear housing portion defining a second circumferentially-extending channel which encloses said second axially-extending portion of said stator windings;

a first cooling tube having a first end and a second end and an embedded portion thereof embedded between said first inner surface and said first outer surface; and a second cooling tube having a first end and a second end and a portion thereof embedded between said second inner surface and said second outer surface.

18. An electrical machine as recited in claim 17, further comprising:

a front bearing supporting said shaft and in turn supported by said front portion of said housing, said front bearing in general axial alignment with said first cooling tube;

a rear bearing supporting said shaft and in turn supported by said rear portion of said housing, said rear bearing in general axial alignment with said second cooling tube.

19. An electrical machine as recited in claim 18, further comprising a rectifier in electrical communication with said stator windings and mounted in thermal communication with said second outer surface.

20. An electrical machine as recited in claim 19, wherein said first end of said first cooling tube and said first end of said second cooling tube are coupled together to permit fluid flow between said first cooling tube and said second cooling tube.

* * * * *